(12) United States Patent
Holland et al.

(10) Patent No.: US 11,668,595 B1
(45) Date of Patent: Jun. 6, 2023

(54) FLUID LEVEL AND CONDUCTIVITY SENSOR FOR HIGH TEMPERATURE APPLICATIONS

(71) Applicant: Consolidated Nuclear Security, LLC, Oak Ridge, TN (US)

(72) Inventors: Justin M. Holland, Clinton, TN (US); Deandra J. Peoples, Nashville, TN (US); Stephen R. Bennett, Rockwood, TN (US); Benjamin D. Green, Knoxville, TN (US)

(73) Assignee: Consolidated Nuclear Security, LLC, Oak Ridge, TN (US)

( * ) Notice: Subject to any disclaimer, the term of this patent is extended or adjusted under 35 U.S.C. 154(b) by 97 days.

(21) Appl. No.: 17/471,589

(22) Filed: Sep. 10, 2021

(51) Int. Cl.
*G01F 23/24* (2006.01)
*G01N 27/07* (2006.01)

(52) U.S. Cl.
CPC .......... *G01F 23/241* (2013.01); *G01F 23/242* (2013.01); *G01N 27/07* (2013.01)

(58) Field of Classification Search
CPC ...... G01F 23/24; G01F 23/241; G01F 23/242; G01F 23/243; G01F 23/244; G01F 23/246; G01F 23/247; G01F 23/248
See application file for complete search history.

(56) References Cited

U.S. PATENT DOCUMENTS 2,230,137 A * 1/1941 Ewertz .................. G01F 23/241
                                                    73/304 R
3,755,804 A * 8/1973 Johnson ................ G01F 23/241
                                                    73/304 R (Continued)

FOREIGN PATENT DOCUMENTS

CN    111912492 A  * 11/2020
DE    3522616 A1  * 1/1987
WO    WO-2006123141 A2 * 11/2006 ........... G01F 23/261

OTHER PUBLICATIONS

Malathi, N., et al., Level monitoring system with pulsating sensor—Application to online level monitoring of dashpots in a fast breeder reactor, Review of Scientific Instruments, 86, Feb. 5, 2015.
Sahoo, P., et al., High performance conductivity monitoring instrument with pulsating sensor, Review of Scientific Instruments, 81, Jun. 29, 2010.

(Continued)

*Primary Examiner* — Herbert K Roberts
(74) *Attorney, Agent, or Firm* — Luedeka Neely Group, P.C.

(57) ABSTRACT

A fluid level and conductivity sensor having a sensing probe with four electrodes disposed therein particularly suited for high temperature applications. A distal end of the second and third electrodes are positioned a distance from the sensing end that is greater than distal ends of the first and fourth electrodes. The sensor includes an electronics system having a signal relay system for receiving signals from each of the electrodes and switching between different measurement modes by determining a resistance between selected pairs of electrodes based on instructions from the microcontroller. The measurement modes include a conductivity measurement mode in which a resistance between the first and fourth electrodes is determined, and a fluid level measurement mode in which a resistance between the first and third electrodes is determined and compared to a resistance between the second and third electrodes.

18 Claims, 4 Drawing Sheets

(56) References Cited

U.S. PATENT DOCUMENTS

| | | | | |
|---|---|---|---|---|
| 4,244,385 A * | 1/1981 | Hotine | .................... | G05D 9/12 307/118 |
| 4,382,382 A * | 5/1983 | Wang | .................... | G01F 23/243 702/53 |
| 4,425,795 A * | 1/1984 | Albrecht | ................ | G01F 23/24 702/53 |
| 4,820,973 A * | 4/1989 | Alvarez | ................ | G01F 23/263 73/304 C |
| 2002/0116999 A1* | 8/2002 | Heger | .................... | G05D 9/12 73/304 C |
| 2005/0229700 A1* | 10/2005 | Chai | .................... | C02F 1/003 73/304 R |
| 2007/0079653 A1* | 4/2007 | Zuleta | ................. | G01F 23/243 73/304 R |
| 2007/0164751 A1* | 7/2007 | Parachini | .............. | G01F 23/241 324/557 |
| 2010/0049150 A1* | 2/2010 | Braga | .................. | A61M 1/784 604/313 |
| 2010/0141285 A1* | 6/2010 | Wernet | ................... | G01F 23/26 324/754.22 |
| 2010/0295565 A1* | 11/2010 | Drack | .................. | G01F 23/263 324/693 |
| 2010/0326186 A1* | 12/2010 | Kamp | .................... | G01F 23/244 73/304 C |
| 2011/0113878 A1* | 5/2011 | Ohshima | ............... | G01F 23/266 73/304 C |
| 2012/0073366 A1* | 3/2012 | Molinaro | ................ | G01F 25/20 73/304 R |
| 2013/0068015 A1* | 3/2013 | Sinha | .................... | G01F 23/263 73/304 C |
| 2013/0166175 A1* | 6/2013 | Kato | ....................... | G01N 9/00 374/142 |
| 2015/0212024 A1* | 7/2015 | Banks | ................... | G01N 27/30 73/61.61 |
| 2015/0275661 A1* | 10/2015 | Donzier | ................. | G01N 27/07 73/152.55 |
| 2016/0114590 A1* | 4/2016 | Arpin | ................... | G01F 23/263 347/7 |
| 2016/0187174 A1* | 6/2016 | Kharsa | ................... | F17D 5/005 73/204.25 |
| 2019/0032958 A1* | 1/2019 | Ohse | ........................ | F24H 9/2021 |
| 2019/0240985 A1* | 8/2019 | Ge | .......................... | B41J 2/195 |
| 2020/0386099 A1* | 12/2020 | Siu | ........................ | E21B 49/08 |
| 2020/0400477 A1* | 12/2020 | Harsh | ...................... | G01F 1/69 |
| 2021/0333140 A1* | 10/2021 | Cerutti | .................. | G01F 23/268 |

OTHER PUBLICATIONS

Sanga, Ramesh, et al., Deployment of quasi-digital sensor for high temperature molten salt level measurement in pyroprocessing plants, Review of Scientific Instruments, 89, Apr. 19, 2018.

* cited by examiner

FLUID LEVEL AND CONDUCTIVITY SENSOR FOR HIGH TEMPERATURE APPLICATIONS

GOVERNMENT RIGHTS

The U.S. Government has rights to this invention pursuant to contract number DE-NA0001942 between the U.S. Department of Energy and Consolidated Nuclear Security, LLC.

FIELD

This disclosure relates to the field of sensors. More particularly, this disclosure relates to a fluid level and conductivity sensor particularly useful for high temperature applications.

BACKGROUND

There are various known devices that may be employed for measurement of fluid level and/or conductivity. However, virtually all of these devices are intended for use with low temperature fluids. What is needed is a sensor for fluid level and conductivity measurement in high temperature conductive fluids such as molten salts, which find use in a variety of industrial and nuclear applications.

Factors such as material compatibility and spatial footprint of the sensor become important in high temperature applications. Further, the relatively high conductivity of molten salts presents challenges to the design of such a sensor and its circuitry. The sensor of the present disclosure solves these and other problems by providing a fluid level and conductivity sensor that has been optimized for use with molten salts while also being usable for other high and low temperature fluids.

SUMMARY

According to one embodiment of the disclosure, a fluid level and conductivity sensor includes a sensing probe including a first sensing end configured to be inserted into a fluid, a second electrical connection end opposite the first sensing end, a first bore having a first electrode disposed therein, a second bore having a second electrode disposed therein, a third bore having a third electrode disposed therein, and a fourth bore having a fourth electrode disposed therein. A distal end of the first and fourth electrodes are positioned a first distance from the first sensing end and a distal end of the second and third electrodes are positioned a second distance from the first sensing end that is greater than the first distance. The sensor further includes an electronics system in electrical communication with the electrical connection end of the sensing probe. The electronics system includes a microcontroller and a signal relay system for receiving signals from each of the first, second, third, and fourth electrodes and switching between different measurement modes by determining a resistance between selected pairs of electrodes based on instructions from the microcontroller. The different measurement modes include a conductivity measurement mode in which a resistance between the first and fourth electrodes is determined, and a fluid level measurement mode in which a resistance between the first and third electrodes is determined and compared to a resistance between the second and third electrodes.

According to certain embodiments, the first distance is such that the first and fourth electrodes are positioned substantially flush with the first sensing end.

According to certain embodiments, the sensing probe includes a sensing probe body that is formed of a ceramic material, the sensing probe body including the first, second, third, and fourth bores.

According to certain embodiments, the first bore and fourth bore include a diameter substantially equal to a diameter of the second bore and the third bore, the first electrode and the fourth electrode include a diameter that is smaller than a diameter of the second and third electrode, and the first and fourth electrodes are each housed in a ceramic sheath for occupying an annular space between the first bore and the first electrode and the fourth bore and the fourth electrode.

According to certain embodiments, the first electrode and the fourth electrode include a diameter ranging from about 24 AWG to about 26 AWG.

According to certain embodiments, the second distance that the second and third electrodes are positioned from the first sensing end of the sensing probe is about 0.25 inches to about 0.5 inches greater than the first distance that the first and fourth electrodes are positioned from the first sensing end.

According to certain embodiments, the signal relay system includes a first signal relay electrically connected to the third electrode and the fourth electrode for switching between the conductivity measurement mode and the fluid level measurement mode and a second signal relay electrically connected to the first electrode and the second electrode for switching between a high level measurement and a low level measurement.

According to certain embodiments, the electronics system further includes an oscillator circuit in electrical communication with the signal relay system, the oscillator circuit for receiving the resistance measurements from the selected pairs of electrodes and producing an output waveform of each of the resistance measurements. In some embodiments, the oscillator circuit includes a rail-to-rail op-amp operable to supply a voltage of less than 3 volts. According to certain embodiments, the oscillator circuit includes a resistance floor of about 40 ohms to about 100 ohms.

According to certain embodiments, the different measurement modes further include a temperature compensation mode in which a first room temperature resistance between the first and fourth electrodes is compared to a second room temperature resistance between the second and third electrodes.

According to another embodiment of the disclosure, a method of determining a fluid level and fluid conductivity of a fluid includes providing a sensing probe including a first sensing end, a second electrical connection end opposite the first sensing end, a first electrode, a second electrode, a third electrode, and a fourth electrode, wherein the first electrode and fourth electrode include a distal end positioned a first distance from the first sensing end and the second and third electrodes include a distal end positioned a second distance from the first sensing end that is greater than the first distance; inserting the first sensing end of the sensing probe into a fluid; and selecting between a plurality of different measurement modes. The different measurement modes include a conductivity measurement mode in which a resistance between the first and fourth electrodes is determined and a fluid level measurement mode in which a resistance between the first and third electrodes is determined and compared to a resistance between the second and third electrodes.

According to certain embodiments, the method further includes providing an electronics system in electrical communication with the electrical connection end of the sensing probe, the electronics system including a microcontroller and a signal relay system for receiving signals from each of the first, second, third, and fourth electrodes and switching between different measurement modes by determining a resistance between selected pairs of electrodes based on instructions from the microcontroller. In some embodiments, the signal relay system includes a first signal relay electrically connected to the third electrode and the fourth electrode for switching between the conductivity measurement mode and the fluid level measurement mode and a second signal relay electrically connected to the first electrode and the second electrode for switching between a high level measurement and a low level measurement.

According to certain embodiments, the first distance is such that the first and fourth electrodes are positioned substantially flush with the first sensing end.

According to certain embodiments, the second distance that the second and third electrodes are positioned from the first sensing end of the sensing probe is about 0.25 inches to about 0.5 inches greater than the first distance that the first and fourth electrodes are positioned from the first sensing end.

According to certain embodiments, the method further includes supplying a voltage of less than 3 volts between the first and fourth electrode during the conductivity measurement mode.

According to certain embodiments, the method further includes determining a temperature compensation ratio for the sensing probe by comparing a first room temperature resistance between the first and fourth electrodes to a second room temperature resistance between the second and third electrodes prior to inserting the first sensing end of the sensing probe into the fluid.

According to yet another embodiment of the disclosure, a conductivity sensor includes a sensing probe having a first sensing end configured to be inserted into a fluid, a second electrical connection end opposite the first sensing end, and a first and second electrode each having a distal end that is substantially flush with the first sensing end. The sensor further includes an electronics system in electrical communication with the electrical connection end of the sensing probe for determining a resistance between the first and second electrodes. The electronics system includes an oscillator circuit having a rail-to-rail op-amp operable to supply a voltage of less than 3 volts between the first and second electrode.

According to certain embodiments, the oscillator circuit includes a resistance floor of about 40 ohms to about 100 ohms.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
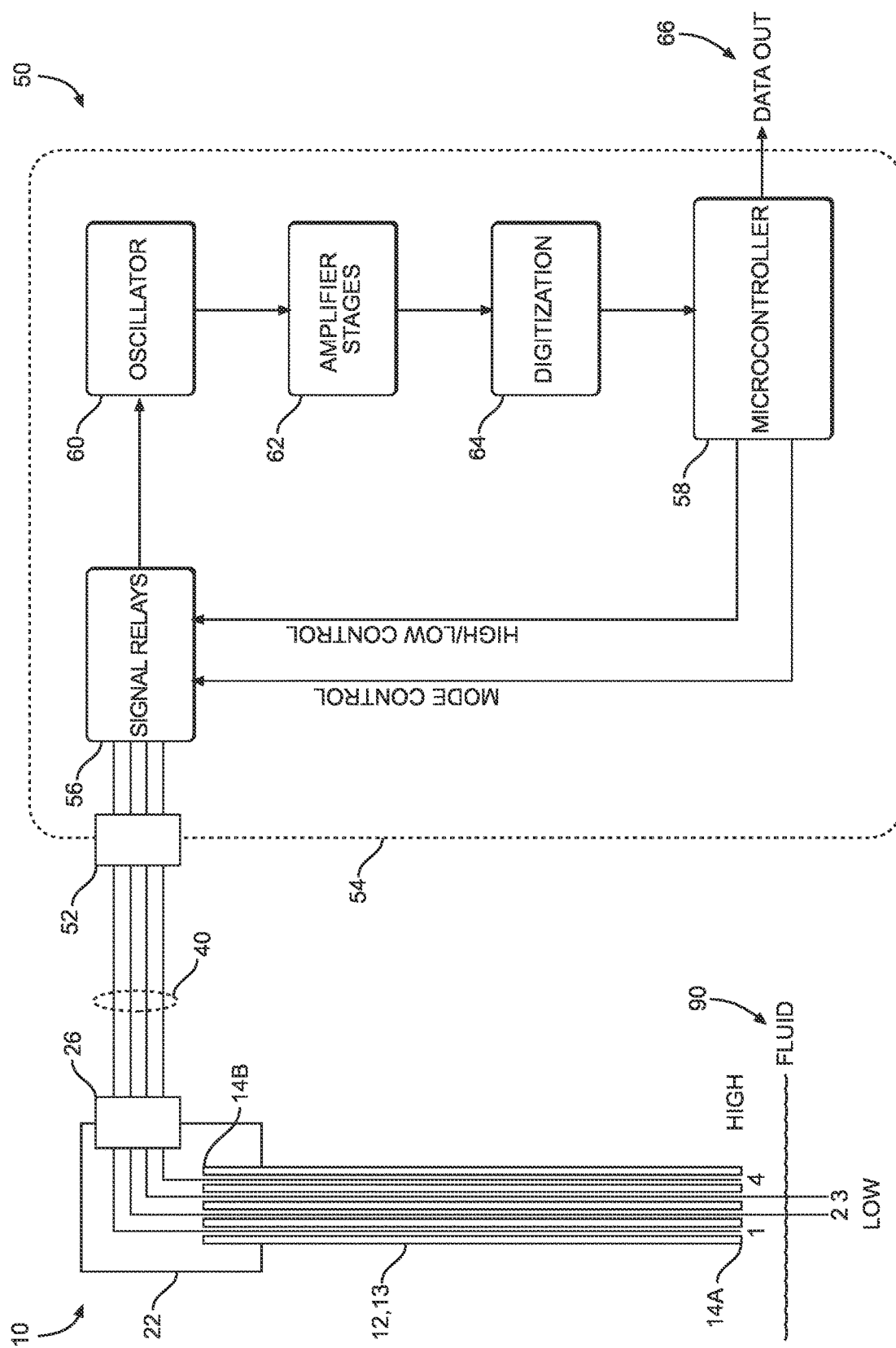
FIG. 1 depicts a conceptual schematic diagram of a fluid level and conductivity sensor according to one embodiment of the present disclosure.

Referring to FIGS. 1 and 2A-2C, a fluid level and conductivity sensor 10 of the present disclosure includes a sensing probe 12 having a first sensing end 14A and a second electrical connection end 14B. As shown best in FIGS. 1 and 2B, sensing probe 12 includes a probe body 13 that includes four bores 16A, 16B, 16C, and 16D extending from the first sensing end 14A to the second electrical connection end 14B for housing four metallic wires 1-4, respectively. The sensing probe body 13 is preferably constructed of a ceramic material such as alumina, quartz, magnesia, silicon carbide, zirconia, etc. that is compatible with the high temperature fluid 90 in which the sensor 10 is intended to be used. In this regard, the primary requirements/considerations for the material used for the sensing probe body 13 are (1) chemical stability, (2) thermal stability, and (3) electrically resistive.

According to certain embodiments, the sensing probe body 13 includes an outer diameter of about 0.25 inches with the four bores 16A, 16B, 16C, and 16D each having a diameter of about 0.078 inches. The wires 1-4 inserted into the bores 16A, 16B, 16C, and 16D are formed of an inert or noble metal to form four electrodes operable to be submerged in the high temperature fluid 90. Thus, for purposes of the present disclosure, wire 1 is also referred to herein as a first electrode 1, wire 2 is also referred to herein as a second electrode 2, wire 3 is also referred to herein as a third electrode 3, and wire 4 is also referred to herein as a fourth electrode 4. To sustain high temperature applications, the wires 1-4 are composed of conductive metals and metal alloys having a high melting temperature. In certain embodiments, the wires may be formed of platinum.

For high temperature applications, the exposed surface area of the metallic wires 1-4 should be minimized. Thus, in preferred embodiments, the distal ends of the first electrode 1 and fourth electrode 4 are disposed adjacent the sensing end 14A of the probe body 13 to form the conductivity sensor component of the fluid level and conductivity sensor 10. In most preferred embodiments, first electrode 1 and fourth electrode 4 are substantially flush with the sensing end 14a of the sensing probe body 13. Further, as shown best in FIG. 2B, first electrode 1 and fourth electrode 4 are preferably small diameter wires (e.g., less than about 24 AWG) to generate a relatively high cell constant on the order of 10 to 100 cm$^{-1}$. In this regard, to maximize the cell constant, (1) smaller diameter wires for wires 1 and 4 may be used; and/or (2) wires 1 and 4 are configured to be substantially flush with the sensing end 14a of the sensing probe as noted above to minimize the exposed surface area of the wires.

Due to the difference between the wire diameter of the first electrode 1 and fourth electrode 4 and the corresponding bore diameters 16A and 16D, appropriately sized ceramic sheaths 20 (e.g., alumina sheaths) may be used to house the wires 1 and 4. When inserted into bores 16A and 16D of probe body 13, the sheaths 20 should occupy as much of the remaining annular space in the bores 16A and 16D as possible to prevent the fluid 90 being measured from wicking up into the body 13 of the sensing probe 12. If needed, a high temperature ceramic cement can also be used as a filler to fill in any remaining gaps between the ends of bores 16a and 16d and the sheaths 20.

As compared to first electrode 1 and fourth electrode 4, second electrode 2 and third electrode 3 extend further from the sensing end 14A of the sensing probe body 13 as compared to the first electrode 1 and fourth electrode 4 to form a fluid level component of sensor 10. Thus, for purposes of the present disclosure, the first electrode 1 and fourth electrode 4 may be described as being positioned a first distance from the sensing end 14A while the second electrode 2 and third electrode 3 are described as being positioned a second distance from the sensing end 14A that is greater than the first distance. However, it should be understood that the "first distance" could be approximately zero when the first electrode 1 and fourth electrode 4 are substantially flush with the sensing end 14A.

The diameters of the wires of second electrode 2 and third electrode 3 are preferably similar in diameter as compared to the bores 16B and 16C in which the second electrode 2 and third electrode 3 are inserted. However, it should be understood that a sheath 20 and/or high temperature ceramic cement as described above with respect to first electrode 1 and fourth electrode 4 may also be used as needed to prevent fluid 90 from entering bores 16B and 16C. The distance in which the second electrode 2 and third electrode 3 extend from the sensing end 14A of the sensing probe 12 (or extend from the distal ends of the first electrode 1 and fourth electrode 4) is based on the desired deadband for the "high-low" level measurement (the "high-low" level measurement being further described below). In certain embodiments, the distance is about 0.25 inches to about 0.5 inches.

Figure 2C:
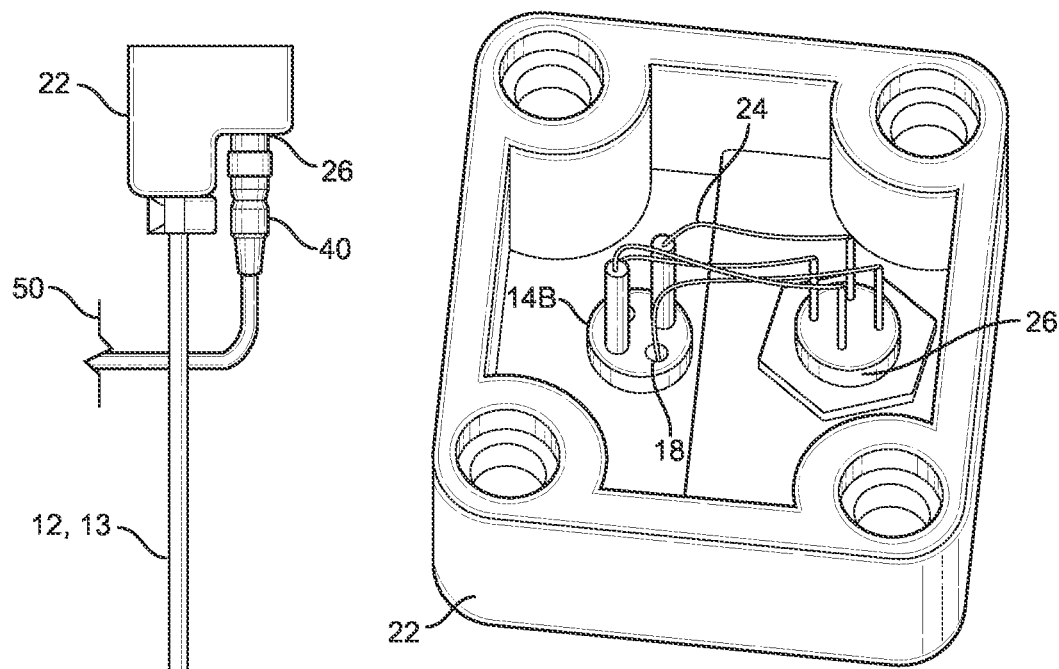
FIG. 2C depicts an overhead perspective view of the interior of the protective cap at the electrical connection end of the sensing probe of FIGS. 2A-2B.
Figures 2A, 2B:
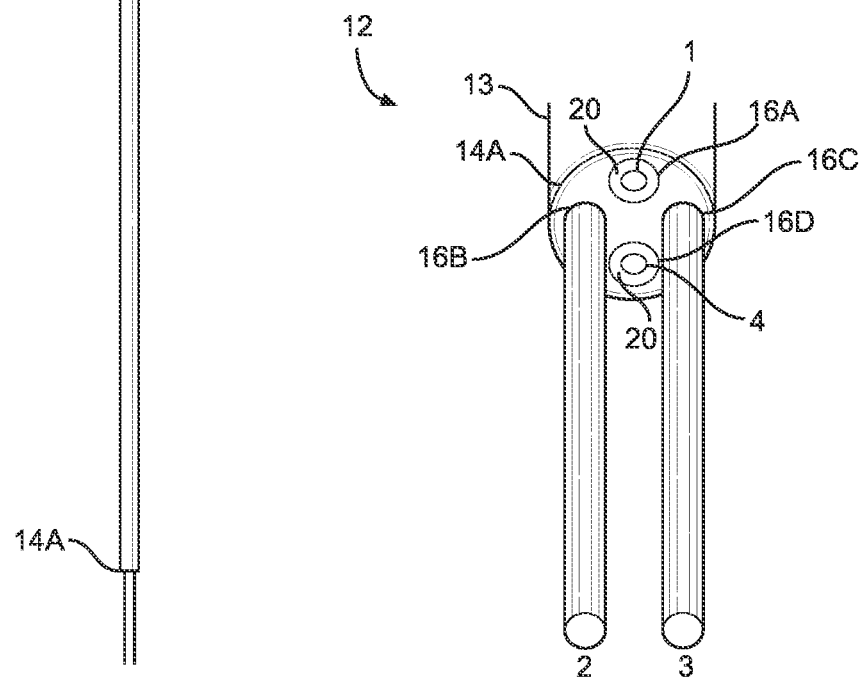
FIG. 2A depicts a front elevational view of a sensing probe according to one embodiment of the present disclosure.
FIG. 2B depicts a bottom perspective view of the sensing end of the sensing probe of FIG. 2A.

With reference to FIGS. 1, 2A, and 2C, sensing probe 12 further includes a protective cap 22 electrically secured to the electrical connection end 14B of sensing probe 12. As shown schematically in FIG. 1, protective cap 22 includes an electrical outlet 26 for electrically connecting the electrodes 1-4 to the electrical inlet 52 of the electronics system 50 of sensor 10 via a standardized cable 40. With more specific reference to FIGS. 2A and 2C, protective cap 22 houses and protects the electrical connection end 14B of sensing probe 12. At the electrical connection end 14B, lead wires 24 are crimped or soldered to the top ends of each of electrodes 1-4 for electrically connecting each of the electrodes 1-4 to the electrical outlet 26 of the protective cap 22. Cable 40 is then operable to be removably connected to the electrical outlet 26 for removably connecting each of the electrodes 1-4 to the remaining electronics system 50 of sensor 10.

With reference back to the schematic diagram of FIG. 1, the electronics system 50 of sensor 10 includes a housing 54 that includes the electrical inlet 52. Housing 54 is preferably located about 3-6 feet away from the sensing probe 12 when sensing probe 12 is connected to the electronics system 50 via cable 40. The signals from the electrodes 1-4 are carried to a relay system 56 that is controlled by a microcontroller 58 (which may be disposed within housing 54 as depicted in FIG. 1 or within an external device) for switching between different measurement modes by selecting different pairs of electrodes between electrodes 1-4 during a particular measurement. The resistance of the selected pairs of electrodes 1-4 establishes the feedback resistance in oscillator 60, which is preferably an op-amp oscillator as described further below. The waveform produced by oscillator 60 is fed to an amplifier stage 62 and finally a digitizer stage 64 to produce a signal that is sent to the microcontroller 58 for further communication as output signal 66 as desired.

Figure 3:
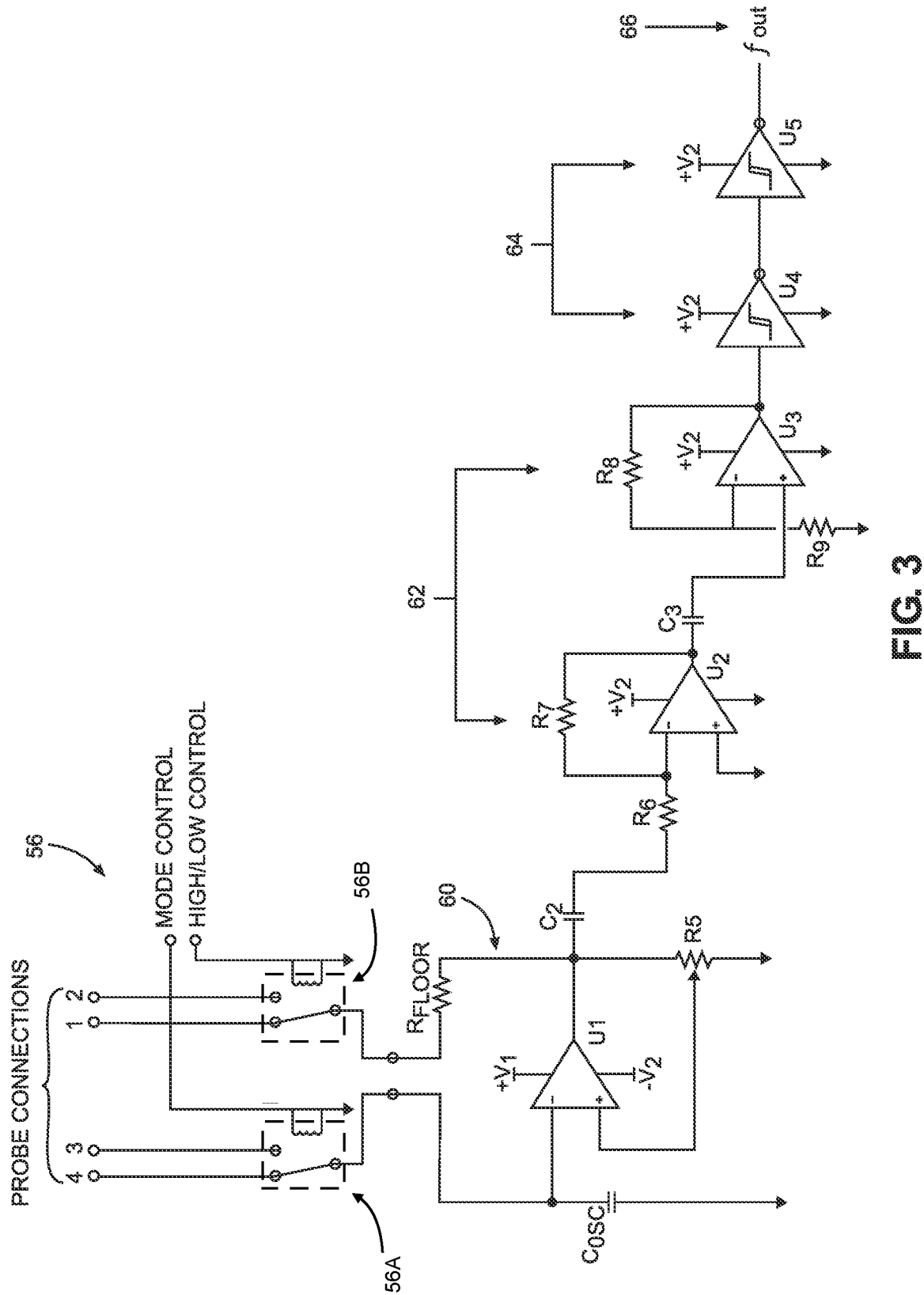
FIG. 3 depicts a circuit diagram of a fluid level and conductivity sensor according to one embodiment of the present disclosure.

With reference to FIG. 3, an exemplary circuit schematic for electronics system 50 is depicted. In this regard, relay system 56 includes a first signal relay 56A and a second signal relay 56B. In certain embodiments, first and second signal relays 56A and 56B are single pole double throw (SPDT) relays as known in the art. The signals from the third electrode 3 and fourth electrode 4 are electrically connected to the first signal relay 56A for switching between measurement modes—conductivity or discrete level measurement. The signals from the first electrode 1 and second electrode 2 are electrically connected to the second signal relay 56B for switching between "High" and "Low" levels of the measurements. Temperature compensation may also be calculated as further described below with respect to Equation 5 when both the first signal relay 56A and the second signal relay 56B are in the ON state. The table below summarizes the measurement modes accessible by the sensor 10 depending on the ON/OFF state of the first signal relay 56A (RLY1) and second signal relay 56B (RLY2).

| Measurement Modes of Exemplary Embodiment of FIG. 3 | | | |
| --- | --- | --- | --- |
| RLY1 | RLY2 | Electrodes Connected | Measurement |
| ON | OFF | 3, 1 | High Level |
| ON | ON | 3, 2 | Low Level/Tcomp |
| OFF | ON | 4, 2 | None |
| OFF | OFF | 4, 1 | Conductivity |

The key considerations in the circuit design of FIG. 3 are 1) achieving a stable, reproducible output over a wide range of solution resistance; and 2) minimizing polarization/electrolysis effects. To achieve the latter goal, a rail-to-rail input/output op-amp that can operate at very low voltages is preferably used to drive the oscillator 60. According to certain embodiments, the op-amp used for the oscillator 60 is sold commercially by Linear Technology Corporation with a product number of LTC1152. The LCTC1152 op-amp is designed to operate rail-to-rail at supply voltages as low as 2.7 volts. Operating the conductivity measurement at about 2.7 volts helps ensure that the waveform across the connected electrodes in the solution is a low amplitude AC signal that minimizes or eliminates electrolysis reactions. A stable, reproducible output from the circuit is ensured in part by adding a resistance floor ($R_{floor}$) in the oscillator feedback loop ($R_{osc}$). This resistance should be set as small as possible to maintain oscillation in the case of a dead-short across the remainder of the feedback loop while also maintaining signal stability. In this regard, choosing larger values of $R_{floor}$ may help improve signal stability, but it will also decrease the sensitivity of the sensor 10. In preferred embodiments of the disclosure, $R_{floor}$ is set at values from 40 to 100 ohm.

Figure 4:
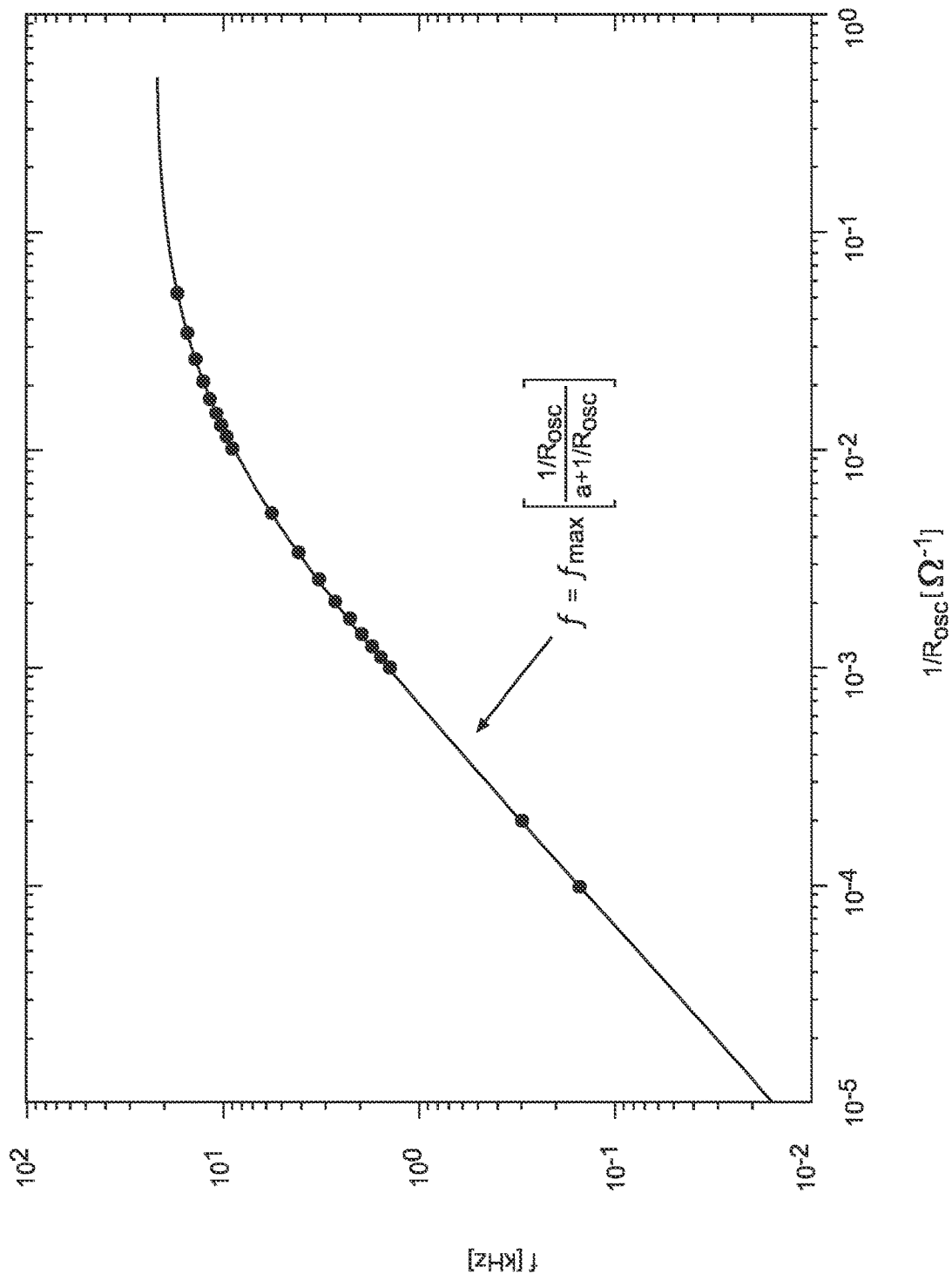
FIG. 4 depicts a frequency calibration chart for the circuitry of a fluid level and conductivity sensor according to one embodiment of the disclosure.

In the conductivity measurement mode, the sensor 10 produces a frequency output that depends on the solution resistance ($R_{soln}$) between first electrode 1 and fourth electrode 4. Thus, it is needed to determine the relationship between the oscillator feedback loop, which is functionally equivalent to $R_{soln}$, and the output frequency. This calibration can be done by connecting the oscillator feedback loop to a known precision potentiometer. A typical result obtained by this calibration is shown in FIG. 4. As shown, the circuit produces a mostly linear response at higher $R_{osc}$ values (>200 ohm), but it deviates from linearity significantly at lower $R_{osc}$ values. The deviation is caused by the value of $R_{osc}$ approaching that of $R_{floor}$ in parallel with the reactance of the feedback capacitor ($C_{osc}$). The following function has been found to fit the data extraordinarily well over the entire operating range of the oscillator 60:

$$f = f_{max}\left[\frac{1/R_{osc}}{\alpha + 1/R_{osc}}\right] \qquad \text{Eqn. 1}$$

The parameter $f_{max}$ in Eqn. 1 represents the maximum frequency in kHz attainable by the circuit when $R_{osc}$ approaches zero, and $\alpha$ is given by:

$$\alpha = \left(\frac{1}{X_G^{avg}} + \frac{1}{R_{floor}}\right) \qquad \text{Eqn. 2}$$

The parameter $X_c^{avg}$ in Eqn. 2 is the average reactive capacitance in the feedback loop over the entire frequency range of the calibration. The values of $f_{max}$, $X_c^{avg}$, and $\alpha$ are all determined by fitting the calibration data to Eqn. 1. It is useful to rearrange Eqn. 1 to allow the oscillator resistance to be calculated whenever conductivity measurements are made:

$$\frac{1}{R_{asc}} = \frac{\alpha}{\left(\frac{f_{max}}{f} - 1\right)} \qquad \text{Eqn. 3}$$

Note that Eqn. 3 has been written in terms of $R_{osc}$, which was originally defined as the resistance added to the feedback loop by the potentiometer during calibration. In order to replace $R_{osc}$ with $R_{soln}$, the additional resistances in the probe cable and electrodes must be accounted for:

$$R_{osc} = R_{soln} + R_{cables} + R_{electrodes} \qquad \text{Eqn. 4}$$

In most applications, the resistance of the cables between the probe and circuitry will likely be a fixed value that can be measured just once prior to performing conductivity measurements. In contrast, the resistance of the electrodes may change significantly over time due to thermal gradients along the probe body. The end of the probe immersed in the high temperature fluid may be as high as 1000° C., while the other end will be at or near room temperature. The existence of such a thermal gradient along the electrode wire running through the ceramic tube would be expected to cause a gradient in resistance as well, which could adversely influence conductivity readings. A compensation strategy has been devised to minimize or eliminate the effect of temperature for the primary embodiment of the disclosure. Assuming that all four electrodes are fabricated of the same metal, the following relationship holds at room temperature:

$$\beta^0 = \frac{R_{1,4}^0}{R_{2,3}^0} = \frac{K_{1,4}^0}{K_{2,3}^0} \qquad \text{Eqn. 5}$$

where $R^0_{1,4}$ and $R^0_{2,3}$ represent the room-temperature resistances of the circuits formed by shorting electrodes 1 and 4 together and electrodes 2 and 3 together, respectively.

The electrodes are shorted together at the end that will be submerged in solution for this measurement. The ratio of these resistances, defined as the constant $\beta^0$, is equal to the ratio of the geometric constants $K^0_{1,4}$ and $K^0_{2,3}$, which are given by length (L) divided by the area (A) of the electrodes. This ratio remains constant with temperature, so long as the electrode materials are the same. The following relationship should then be expected to hold:

$$R_{electrodes} = R_{1,4}^T = \beta^0 R_{2,3}^T \qquad \text{Eqn. 6}$$

It is reasonable to assume that the solution resistance is negligibly small between electrodes 2 and 3, due to their relatively large diameter and submerged length. In that case, the frequency, $f^T$, measured between electrodes 2 and 3 should be attributable to $R^T_{2,3}$ alone. Substituting Eqn. 3 into Eqn. 6 yields the following expression for the electrode resistance:

$$R_{electroeds} = \frac{\beta^0}{\alpha}\left[\frac{f_{max}}{f^T} - 1\right] \qquad \text{Eqn. 7}$$

Now that an expression has been derived for the temperature-compensated resistance of the electrodes, the conductivity can be calculated using the fundamental equation:

$$\sigma_{soln} = K_{cell}\left(\frac{1}{R_{soln}}\right) \qquad \text{Eqn. 8}$$

Here, $K_{cell}$ represents the cell constant of the conductivity measurement cell comprised of electrodes 1 and 4. It can be determined by calibration of the probe in a conductivity standard solution at its specified reference temperature. Substituting Eqns. 3, 4 and 7 into Eqn. 8 yields the final form of the conductivity equation according to a preferred embodiment for the sensor 10 of the present disclosure:

$$\sigma_{soln} = K_{cell}\left(\frac{1}{\frac{1}{\alpha}\left[\frac{f_{max}}{f} - 1\right] - \frac{\beta^0}{\alpha}\left[\frac{f_{max}}{f^T} - 1\right] - R_{cables}}\right) \qquad \text{Eqn. 9}$$

Note that there are two frequencies present in Eqn. 9, f and $f^T$. The former is the frequency measured by the conductivity electrodes 1 and 4, while the latter is the frequency measured by the temperature compensation electrodes 2 and 3.

In discrete level measurement mode, first signal relay 56A should be toggled to ON and second signal relay 56B can be switched between OFF and ON to measure "High" and "Low" levels, respectively. If the fluid level is below both the "High" electrode (electrode 1) and the "Low" electrode (electrode 2), the circuit should in principle be open and there should be no frequency output from the instrument. However, it has been found in practice that due to the small dimensions of the probe, some fluid may remain between the electrodes even when removed from the liquid. Despite this non-ideal behavior, there is still a significant decrease in the frequency output that reliably indicates fluid level by establishing frequency thresholds for the probe in connection with various fluids. When the fluid is above the "Low" electrode but below the "High" electrode, the frequency output for the "Low" measurement will be near $f_{max}$ while that of the "High" electrode will be near zero. As the fluid rises above the "High" electrode, both the "High" and "Low" measurements will yield frequencies much greater than zero.

According to another aspect of the disclosure, the microcontroller 58 used in this disclosure employs routines to perform measurements of fluid level and conductivity. For example, the microcontroller 58 may be used to provide control signals for the first and second relays 56A and 56B such that sensor 10 performs level measurements at both the High and Low levels periodically. Following the level measurement routine, the device sends control signals to the relays 56A and 56B to allow frequency measurement on the conductivity and temperature compensation electrodes. This data is processed according to Eqn. 10 to provide the user with conductivity readings.

According to another embodiment of the disclosure, sensor 10 could be modified to provide conductivity measurements only. According to this embodiment, sensor 10 would include the first electrode 1 and the fourth electrode 4. Second electrode 2, third electrode 3, and the relay system 56 could then be omitted. Sensor 10 could then provide the user with conductivity readings of high temperature fluids using first electrode 1 and fourth electrode 4 substantially as described above. For purposes of the present disclosure, it should be understood that fourth electrode 4 could also be referred to as a second electrode when sensor 10 is modified to include only two electrodes for providing conductivity measurements only.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A fluid level and conductivity sensor comprising:
a sensing probe including a first sensing end configured to be inserted into a fluid, a second electrical connection end opposite the first sensing end, a first bore having a first electrode disposed therein, a second bore having a second electrode disposed therein, a third bore having a third electrode disposed therein, and a fourth bore having a fourth electrode disposed therein, wherein a distal end of the first and fourth electrodes are positioned a first distance from the first sensing end and a distal end of the second and third electrodes are positioned a second distance from the first sensing end that is greater than the first distance;
an electronics system in electrical communication with the electrical connection end of the sensing probe, the electronics system including:
a microcontroller, and
a signal relay system for receiving signals from each of the first, second, third, and fourth electrodes and switching between different measurement modes by determining a resistance between selected pairs of electrodes based on instructions from the microcontroller, the different measurement modes including:
a conductivity measurement mode in which a resistance between the first and fourth electrodes is determined, and
a fluid level measurement mode in which a resistance between the first and third electrodes is determined and compared to a resistance between the second third electrodes.

2. The sensor of claim 1 wherein the first distance is such that the first and fourth electrodes are positioned substantially flush with the first sensing end.

3. The sensor of claim 1 wherein the sensing probe includes a sensing probe body that is formed of a ceramic material, the sensing probe body including the first, second, third, and fourth bores.

4. The sensor of claim 1 wherein the first bore and fourth bore include a diameter substantially equal to a diameter of the second bore and the third bore, the first electrode and the fourth electrode include a diameter that is smaller than a diameter of the second and third electrode, and the first and fourth electrodes are each housed in a ceramic sheath for occupying an annular space between the first bore and the first electrode and the fourth bore and the fourth electrode.

5. The sensor of claim 1 wherein the first electrode and the fourth electrode include a diameter ranging from about 24 AWG to about 26 AWG.

6. The sensor of claim 1 wherein the second distance that the second and third electrodes are positioned from the first sensing end of the sensing probe is about 0.25 inches to about 0.5 inches greater than the first distance that the first and fourth electrodes are positioned from the first sensing end.

7. The sensor of claim 1 wherein the signal relay system includes a first signal relay electrically connected to the third electrode and the fourth electrode for switching between the conductivity measurement mode and the fluid level measurement mode and a second signal relay electrically connected to the first electrode and the second electrode for switching between a high level measurement and a low level measurement.

8. The sensor of claim 1 wherein the electronics system further includes an oscillator circuit in electrical communication with the signal relay system, the oscillator circuit for receiving the resistance measurements from the selected pairs of electrodes and producing an output waveform of each of the resistance measurements.

9. The sensor of claim 8 wherein the oscillator circuit includes a rail-to-rail op-amp operable to supply a voltage of less than 3 volts.

10. The sensor of claim 9 wherein the oscillator circuit includes a resistance floor of about 40 ohms to about 100 ohms.

11. The sensor of claim 1 wherein the different measurement modes further include a temperature compensation mode in which a first room temperature resistance between the first and fourth electrodes is compared to a second room temperature resistance between the second and third electrodes.

12. A method of determining a fluid level and fluid conductivity of a fluid, the method comprising:
providing a sensing probe including a first sensing end, a second electrical connection end opposite the first sensing end, a first electrode, a second electrode, a third electrode, and a fourth electrode, wherein the first electrode and fourth electrode include a distal end positioned a first distance from the first sensing end and the second and third electrodes include a distal end positioned a second distance from the first sensing end that is greater than the first distance;

inserting the first sensing end of the sensing probe into a fluid; and selecting between a plurality of different measurement modes, the different measurement modes including a conductivity measurement mode in which a resistance between the first and fourth electrodes is determined and a fluid level measurement mode in which a resistance between the first and third electrodes is determined and compared to a resistance between the second and third electrodes.

13. The method of claim 12 further comprising providing an electronics system in electrical communication with the electrical connection end of the sensing probe, the electronics system including a microcontroller and a signal relay system for receiving signals from each of the first, second, third, and fourth electrodes and switching between different measurement modes by determining a resistance between selected pairs of electrodes based on instructions from the microcontroller.

14. The method of claim 13 wherein the signal relay system includes a first signal relay electrically connected to the third electrode and the fourth electrode for switching between the conductivity measurement mode and the fluid level measurement mode and a second signal relay electrically connected to the first electrode and the second electrode for switching between a high level measurement and a low level measurement.

15. The method of claim 12 wherein the first distance is such that the first and fourth electrodes are positioned substantially flush with the first sensing end.

16. The method of claim 12 wherein the second distance that the second and third electrodes are positioned from the first sensing end of the sensing probe is about 0.25 inches to about 0.5 inches greater than the first distance that the first and fourth electrodes are positioned from the first sensing end.

17. The method of claim 12 further comprising supplying a voltage of less than 3 volts between the first and fourth electrode during the conductivity measurement mode.

18. The method of claim 12 further comprising determining a temperature compensation ratio for the sensing probe by comparing a first room temperature resistance between the first and fourth electrodes to a second room temperature resistance between the second and third electrodes prior to inserting the first sensing end of the sensing probe into the fluid.

* * * * *